United States Patent [19]

Fodor

[11] B 4,000,221

[45] Dec. 28, 1976

[54] RADIAL BLOCK COPOLYMERS STABILIZED BY A UREA COMPOUND

[75] Inventor: Lawrence M. Fodor, Bartlesville, Okla.

[73] Assignee: Phillips Petroleum Company, Bartlesville, Okla.

[22] Filed: Sept. 30, 1974

[21] Appl. No.: 510,458

[44] Published under the second Trial Voluntary Protest Program on February 10, 1976 as document No. B 510,458.

Related U.S. Application Data

[62] Division of Ser. No. 342,531, March 19, 1973, Pat. No. 3,859,250.

[52] U.S. Cl. .................. 260/880 B; 260/45.9 NC
[51] Int. Cl.$^2$ ........................................ C08K 5/52
[58] Field of Search ........... 260/45.9 NC, 45.95 H, 260/880 B

[56] References Cited

UNITED STATES PATENTS

| | | | |
|---|---|---|---|
| 2,766,219 | 10/1956 | Beaver | 260/45.9 NC |
| 2,781,330 | 2/1957 | Downey | 260/45.9 NC |
| 3,355,419 | 11/1967 | Cook | 260/45.9 NC |
| 3,355,421 | 11/1967 | Cook | 260/45.95 H |
| 3,535,277 | 10/1970 | Miller | 260/45.95 H |
| 3,629,372 | 12/1971 | Drake | 260/880 B |
| 3,658,743 | 4/1972 | Bevilacqua | 260/45.9 NC |

*Primary Examiner*—Paul R. Michl

[57] ABSTRACT

Radial block copolymers of a monovinyl-substituted aromatic compound and a conjugated diene are rendered stable against melt flow drop off by the addition thereto of a stabilizer system which comprises (a) a hindered phenol (b) an organic phosphite and (c) a nitrogen containing compound.

4 Claims, No Drawings

RADIAL BLOCK COPOLYMERS STABILIZED BY A UREA COMPOUND

CROSS REFERENCE TO RELATED APPLICATIONS

This is a divisional of copending application Ser. No. 342,531 filed Mar. 19, 1973 now U.S. Pat. No. 3,859,250.

BACKGROUND OF THE INVENTION

This invention relates to the stabilization of radial block copolymers of a monovinyl-substituted aromatic compound and a conjugated diene.

Radial block copolymers of a monovinyl-substituted aromatic compound and a conjugated diene such as styrene and butadiene are known in the art, and are useful for a variety of purposes. However, for some applications it is desirable that the polymer be rendered more stable against thermally induced degradation. It is known to add a variety of different types of stabilizers to various types of polymers to protect same against deterioration. Nevertheless, in some instances radial block copolymers stabilized with conventional systems exhibit a particular type of deterioration which is evidenced by drop off in melt flow on heating for extended times, such as may be encountered in conventional fabrication operations involving extrusion and the like.

SUMMARY OF THE INVENTION

It is an object of this invention to provide stable radial block copolymer composition;

it is another object of this invention to avoid melt flow drop off of radial block copolymer which is subjected to extended thermal history; and it is a further object of this invention to provide a stabilizer system of exceptional effectiveness utilizing non-toxic components.

In accordance with this invention, a resinous radial block copolymer of a monovinyl-substituted aromatic compound and a conjugated diene is rendered stable against degradation by (a) a sterically hindered phenol (b) an organic phosphite and (c) a nitrogen containing compound.

DESCRIPTION OF THE PREFERRED EMBODIMENTS

As used herein the term sterically hindered phenol includes a phenol of the formula:

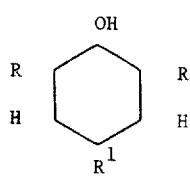

wherein R is H or an alkyl, cycloalkyl, or aralkyl radical or mixtures thereof containing 3–20 carbon atoms, no more than one R being H and $R^1$ is H or an alkyl, cycloalkyl, or aralkyl radical or mixtures thereof containing 1–20 carbon atoms;

or an alkylene or alkylidine bisphenol of the formula

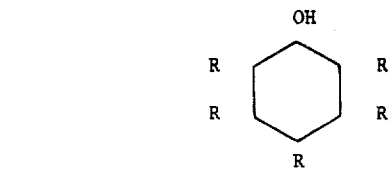

wherein R is H or an alkyl, cycloalkyl or aralkyl radical having from 1–20 carbon atoms, at least one R ortho to the OH being a radical having at least 3 carbon atoms and where, additionally, one R is a radical of the formula

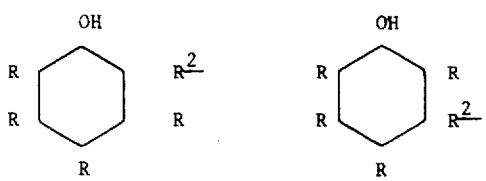

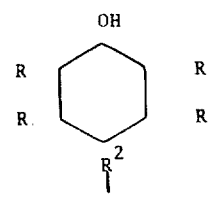

wherein R is as defined hereinabove and $R^2$ is an alkylene group having 1–12 carbon atoms or an alkylidene group having 2–12 carbon atoms. Exemplary of these sterically hindered phenols are:

2,6-di-t-butyl-4-methylphenol
2,6-diisopropyl-4-methylphenol
2,4,6-tri-t-butylphenol
2,6-dicyclohexyl-phenol
2,6-di-t-octyl-4-methylphenol
2,6-diisopropyl-4-t-octylphenol
2,6-di-t-butyl-4-octadecylphenol
2,6-di (1-methylbenzyl)-4-methylphenol
2-methyl-4-methyl-6-t-octylphenol
2-(1-methylbenzyl)-4-hexylphenol
2-(2-sec-dodecyl)-4-n-amylphenol
2-methylphenol
2-methyl-6-isopropylphenol
2-tertiary-butyl-4-methylphenol
2,2'-(1 methyl-pentylidene)-bis-(4-methyl-6-isopropylphenol)
2-amylphenol
2-nonylphenol
2-dodecylphenol
2-tetradecylphenol
4,4'-methylene bis(2,6-diisopropylphenol)
2,2'-ethylidene bis(4,6-di-tert-octylphenol)
4,4'-butylidene bis(6-tert-butyl-meta-cresol)
4,4'-(1-methyl-propylidene)-bis-(2-tert-butyl-5-methylphenol)
4,4'-isopropylidene bis(2,6-di-tert-butylphenol)
4,4'-isopropylidene bis[2,6-di(a-methylbenzyl)-phenol]
4,4'-methylene bis[2-tert-butyl-6-(a-methylbenzyl)-phenol]
2,2'-methylene bis(4-methyl-6-tert-butylphenol)

As used herein, the term organic phosphite includes phosphites represented by the following formula:

wherein R³ is an alkyl, aryl, or cycloalkyl, radical containing 1-15 carbon atoms and combinations thereof. By this definition R³ would encompass a combination radical such as aralkyl, and alkaryl. The R³ radicals can be the same or different.

Exemplary of applicable phosphites are:
tri(nonylphenyl) phosphite
triethyl phosphite
triphenyl phosphite
tri(2,4-dimethylphenyl) phosphite
methyl diphenyl phosphite
diisooctyl phenyl phosphite
phenyl di(2-ethylhexyl) phosphite
phenyl dicyclohexyl phosphite
di(2-ethylcyclohexyl) n-butyl phosphite
3-cyclopentylpropyl dihexyl phosphite
2-phenylnonyl amyl dodecyl phosphite
didecyl trimethyl phosphite The nitrogen containing compound can be either a urea compound or a sulfur containing amino acid as these two materials are defined hereinbelow.

The urea compound is represented by the following formula:

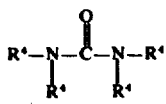

wherein each R⁴ can be the same or different and is H or an alkyl or cycloalkyl radical or combinations thereof containing 1-12 carbon atoms. Exemplary of these urea compounds are:
urea
1-t-butylurea
1,1-dimethylurea
1,3-diethylurea
1-cyclohexylurea
1,3-dicyclohexylurea
1,3-didodecylurea
1,1,3-trimethylurea
1,1,3,3-tetramethylurea The sulfur containing amino acid can be represented by the following formula:
R⁵SR⁶(NH₂)COOM
wherein R⁵ is hydrogen, a 1-10 carbon atom hydrocarbon radical, or
—SR⁶(NH₂)COOM;
R⁶ is an alkylene group having 1-10 carbon atoms; and M is hydrogen, —NH₄, or a Periodic Group IA metal.

Preferred amino acids are cystine, cysteine, and methionine, all of which are naturally occurring amino acids which are non-toxic.

The resinous block copolymer composition of the invention must contain an effective stabilizing amount of the additives which in parts by weight of each component of the stabilizing system to be admixed with 100 parts per weight of the polymer is generally as follows: sterically hindered phenol 0.025 to 2, preferably 0.05 to 1; organic phosphite 0.25 to 5, preferably 0.5 to 2; and nitrogen containing compound 0.05 to 2, preferably 0.1 to 0.5. The total stabilizing system comprising all three components constitutes 1 to 6, preferably 1.5 to 5. The components can be mixed with the polymer separately or together by means of conventional practices known in the art such as by means of a roll mill, or the like.

Other additives such as UV stabilizers, fillers, lubricants, pigments, dyes and the like can be admixed with the compositions of the invention.

Radial block copolymer to be stabilized in accordance with the instant invention can be any resinous polymer having at least three vinylsubstituted aromatic compound/conjugated diene block copolymer chains radiating from a central nucleus. The word "resinous" is used herein in its conventional sense to denote a normally solid material not having elastic properties. Generally such materials will have a Shore D hardness (ASTM D 1706-61) of greater than 62, preferably greater than 69. Preparation of such radial polymers is broadly disclosed in Zelinski et al, U.S. Pat. No. 3,281,383 issued Oct. 25, 1966, the disclosure of which is hereby incorporated by reference, it being understood that the radial block copolymers stabilized in accordance with this invention are limited to those having resinous characteristics. Resinous block copolymers having branches of polymer which demonstrate a plurality of modes on a gel permeation chromatograph curve prior to coupling as disclosed in Kitchen et al., U.S. Pat. No. 3,639,517, the disclosure of which is hereby incorporated for a reference, are especially suitable.

The resinous radial block polymers stabilized in accordance with this invention can broadly be viewed as any radial conjugated diene/ vinyl-substituted aromatic compound block copolymer prepared by first introducing said vinyl-substituted aromatic compound in the presence of an organo-lithium initiator, thereafter adding said conjugated diene monomer to produce a block copolymer containing an active lithium atom on one end of the polymer chain as more fully described in said Zelinski et al. patent. This lithium-terminated copolymer is then reacted with a compound which has at least three reactive sites capable of reacting with the lithium-carbon bond and adding to the carbon possessing this bond in the polymer. The result is a polymer having relatively long branches which radiate from the nucleus formed by the polyfunctional compound which is reacted with the lithium-terminated polymer. Preferred organolithium compounds can be represented by the formula: RLi, wherein R is a hydrocarbon radical selected from the group consisting of aliphatic, cycloaliphatic, and aromatic radicals and combinations thereof containing 1-20 carbon atoms, such as n-butyl lithium.

Types of compounds having at least three reactive sites include polyepoxides, polyisocyanates, polyimines, polyaldehydes, polyketones, polyanhydrides, polyesters, polyhalides, and the like.

These resinous radial block copolymers comprise 70-95 weight per cent polymerized monovinyl-substituted aromatic hydrocarbon monomer containing from 8-18 carbon atoms per molecule and from about 30-5 weight per cent polymerized conjugated diene monomer containing from about 4-12 carbon atoms per molecule based on the total weight of the resinous block copolymer. Preferably the copolymers contain a weight ratio of styrene to butadiene within the range of 75:25 to 85:15. The polymer preferably has a melt flow in the range of about 0.5 to 20.0 grams/10 min. as determined by ASTM D 1238-65T, condition G. The block copolymer branches can be uniform in molecular weight distribution within the branches or have a polymodal distribution by charging the monovinyl-substituted aromatic hydrocarbon monomer in a plurality of increments as described in said Kitchen et al. patent referred to hereinabove.

The thus stabilized composition can be worked into the desired shape by milling, calendaring, extrusion, injection molding or the like and will exhibit considerably improved resistance to reduction in melt flow during the processing.

EXAMPLE I

Resinous radial block copolymers of butadiene and styrene having a weight ratio of styrene to butadiene of 75 to 25 were made by first charging cyclohexane, sytrene and n-butyllithium to a reactor. After substantially all of the styrene polymerized the butadiene was added. Thereafter an epoxidized soy bean oil having a molecular weight of about 1000 and about 4 epoxy groups per formula weight was added to couple the polymer chains. The solids content in the reactor was about 30 per cent. The polymer was stabilized with 1.5 parts by weight tris(nonylphenyl) phosphite per 100 parts resin (phr) and 0.5 phr 2,6-ditertiarybutyl-4-methylphenol plus urea ($NH_2CONH_2$) in the amounts indicated. The compositions were held at 230°C for the times indicated and melt flow determined.

|  | Urea (phr) | Melt Flow at 230°C and 5 kg. | | | |
|---|---|---|---|---|---|
|  |  | 5 min. | 10 min. | 20 min. | 30 min. |
| Control | 0 | 11.4 | 12.0 | 11.6 | 9.5 |
| Run 1 | 0.20 | 8.9 | 9.9 | 11.0 | 11.2 |
| Control | 0 | 14.6 | 13.8 | 10.6 | 5.5 |
| Run 2 | 0.30 | 11.6 | 12.2 | 13.9 | 13.7 |
| Control | 0 | 13.1 | 13.2 | 11.8 | 10.0 |
| Run 3 | 0.20 | 14.2 | 16.0 | 16.1 | 14.5 |
| Control | 0 | 7.9 | 8.3 | 4.1 | 2.5 |
| Run 4 | 0.20 | 6.1 | 6.5 | 6.6 | 5.4 |

As can be seen the runs of the invention exhibited resistance to melt flow drop off.

EXAMPLE II

Polymer made according to the same recipe as that used in Example I was tested in an identical manner. All of the compositions in the following table contained 1.5 phr tris nonylphenylphosphite and 0.5 phr 2,6-ditertiary butyl-4-methyl phenol, plus the indicated additive. Results were as follows.

|  | Additive Type | phr | Melt Flow (230°C & 5 kg wt) | | | | | |
|---|---|---|---|---|---|---|---|---|
|  |  |  | 5 min. | 10 | 15 | 20 | 25 | 30 |
| Control |  | — | 16.5 | 17.9 | 17.2 | 14.6 | 12.8 | 12.2 |
| Run 5 | Cysteine HCl hydrate | 0.10 | 16.3 | 17.3 | 18.6 | 18.7 | 20.0 | 21.1 |
| Run 6 | Cysteine HCl hydrate | 0.15 | 13.6 | 14.0 | 15.6 | 16.3 | 16.4 | 17.3 |
| Run 7 | Cystine | 0.10 | 14.2 | 14.6 | 15.4 | 15.6 | 16.5 | 17.5 |
| Run 8 | Cystine | 0.15 | 14.4 | 15.1 | 15.8 | 17.1 | 17.4 | 18.6 |
| Run 9 | Methionine | 0.10 | 13.3 | 15.2 | 16.3 | 15.8 | 15.3 | 16.0 |
| * | Methionine | 0.15 | 8.1 | 8.1 | 6.3 | 4.5 | 3.6 | 3.2 |

*This represents a spurious result due possibly to failure to incorporate an additive.

The cysteine was added in a concentration of 0.10 grams per cc in water. The cystine was added in a concentration of 0.10 grams per cc in water as the disodium salt. The methionine was added in a concentration 0.10 grams per cc in water as the sodium salt.

While this invention has been described in detail for the purpose of illustration, it is not to be construed as limited thereby but is intended to cover all changes and modifications within the spirit and scope thereof.

What is claimed is:

1. A composition stabilized against melt flow drop off comprising: a resinous radial block copolymer of a monovinyl-substituted aromatic compound and a conjugated diene having incorporated therein an effective stabilizing amount of a stabilizer system consisting essentially of (a) a sterically hindered phenol, (b) an organic phosphite, and (c) urea.

2. A composition according to claim 1 wherein said hindered phenol is present in an amount within the range of 0.05 to 1 parts per hundred parts by weight of said copolymer, said organic phosphite is present in an amount within the range of 0.5 to 2 parts per hundred parts by weight of said copolymer and said urea compound is present in an amount within the range of 0.1 to 0.5 parts per hundred parts by weight of said copolymer.

3. A composition according to claim 1 wherein said resinous radial polymer is a styrene/butadiene polymer having a weight ratio of styrene to butadiene within the range of 75:25 to 85:15 and wherein said hindered phenol is 2,6-ditertiary-butyl-4-methylphenol and said phosphite is tris(nonylphenyl) phosphite.

4. A composition according to claim 3 wherein said hindered phenol is present in an amount within the range of 0.05 to 1 parts per hundred parts by weight of said copolymer, said organic phosphite is present in an amount within the range of 0.5 to 2 parts per hundred parts by weight of said copolymer, and said urea compound is present in an amount within the range of 0.1 to 0.5 parts per hundred parts by weight of said copolymer.

* * * * *